A. P. AIKEN.
SCALE.
APPLICATION FILED JAN. 21, 1909.
1,080,401.
Patented Dec. 2, 1913.
4 SHEETS—SHEET 3.
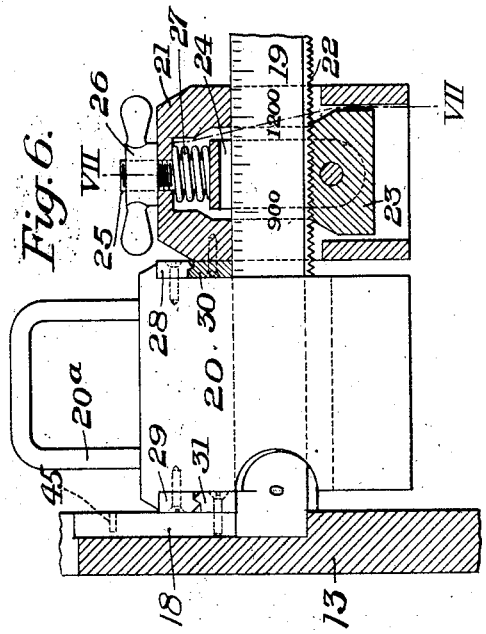
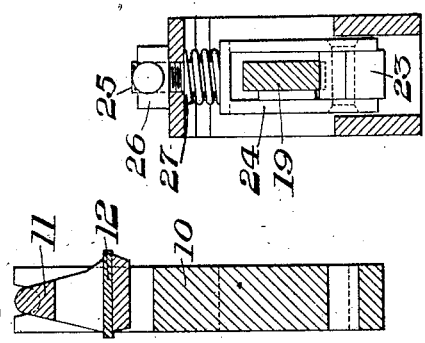
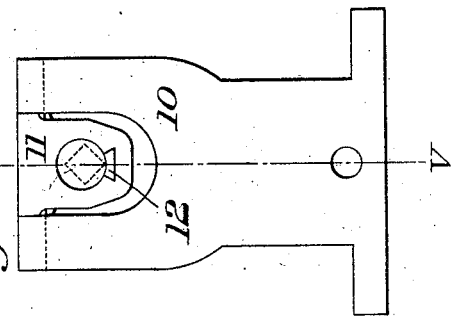
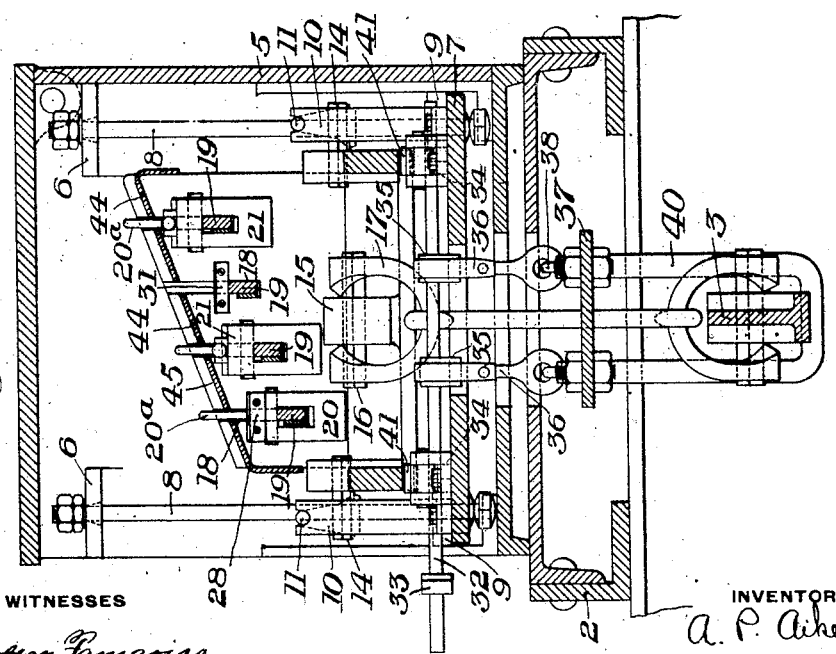
WITNESSES
INVENTOR
A. P. Aiken,
by Bakewell, Byrnes, Parmelee,
his Attys.

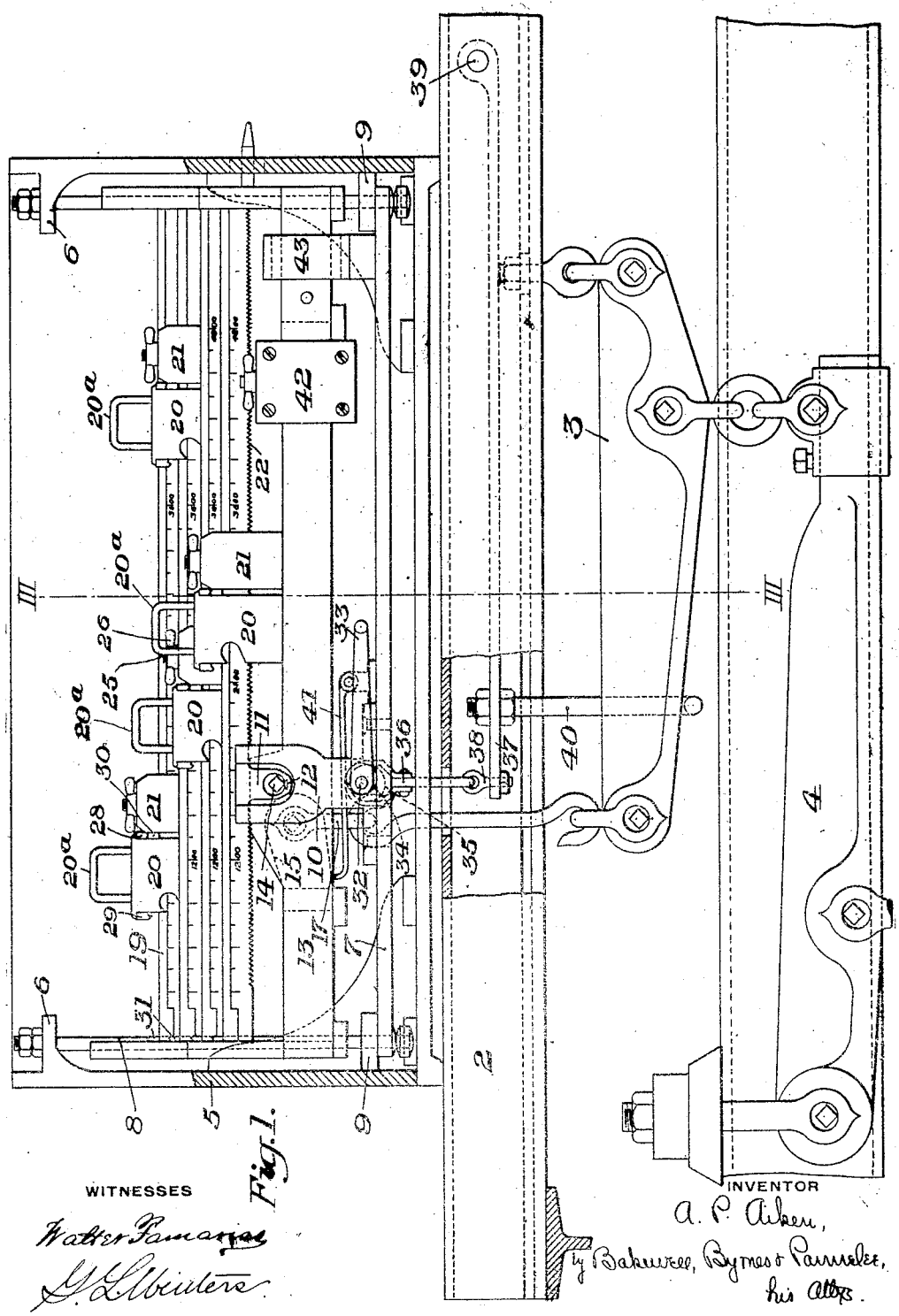

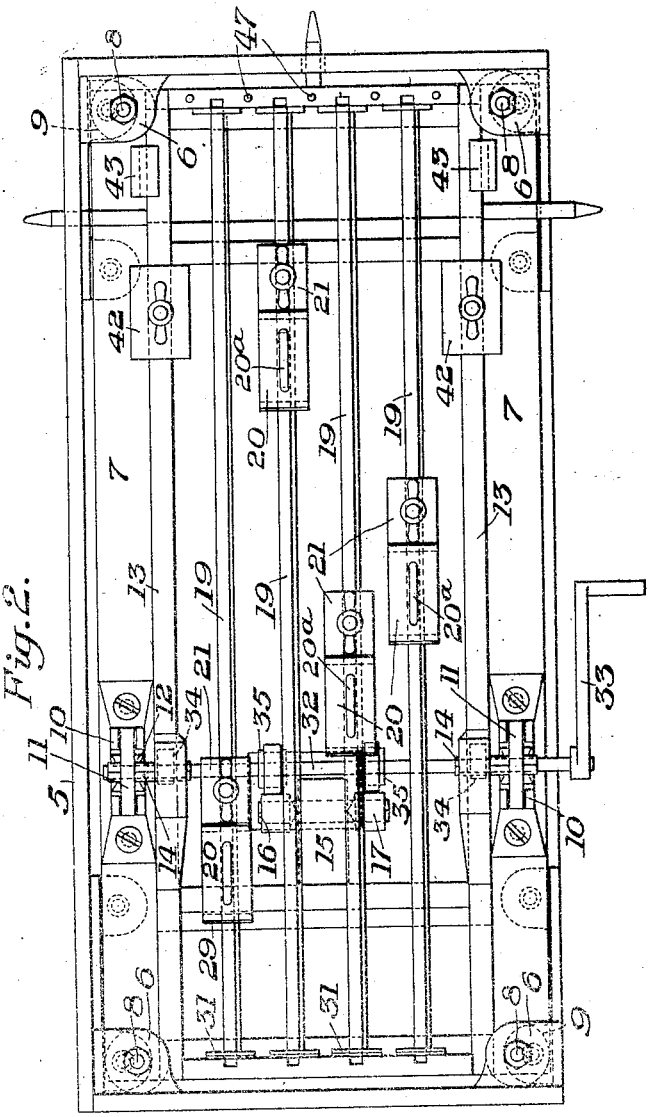

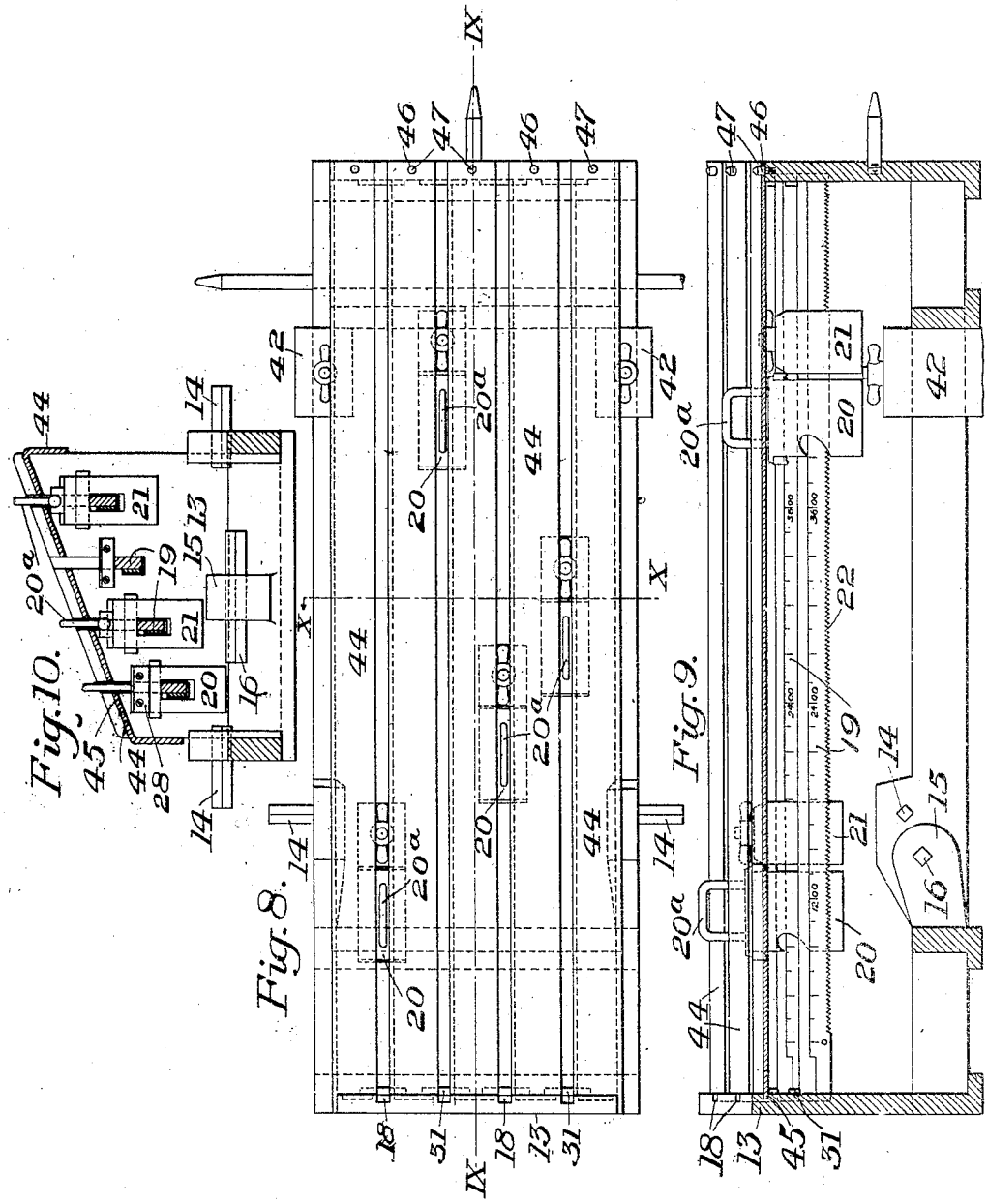

UNITED STATES PATENT OFFICE.

ALBION P. AIKEN, OF BRADDOCK, PENNSYLVANIA.

SCALE.

1,080,401. Specification of Letters Patent. Patented Dec. 2, 1913.

Application filed January 21, 1909. Serial No. 473,513.

*To all whom it may concern:*

Be it known that I, ALBION P. AIKEN, of Braddock, in the county of Allegheny and State of Pennsylvania, have invented a new and useful Improvement in Scales, of which the following is a full, clear, and exact description, reference being had to the accompanying drawings, forming part of this specification, in which—

Figure 1 is a side elevation of a scale beam box and a portion of the scales with one form of my improvement attached; Fig. 2 is a plan view of the beam box; Fig. 3 is a sectional view on the line III—III of Fig. 1; Fig. 4 is a detail side elevation of one of the beam bearings; Fig. 5 is a sectional view on the line V—V of Fig. 4; Fig. 6 is a detail side elevation showing a portion of one of the beam blades with its poise and the adjustable stop for the poise, the stop being shown in section; Fig. 7 is a sectional end view of the stop taken on the line VII—VII of Fig. 6; Fig. 8 is a plan of the scale beam showing the cover or shield for the graduated blades on the beam, with the slots or openings in the cover through which the beam poise bails or handles project; Fig. 9 is a longitudinal sectional elevation of the same taken on the line IX—IX of Fig. 8; Fig. 10 is a sectional end elevation of the scale beam taken on the line X—X of Fig. 8.

My invention relates to weighing scales, particularly to scales which are attached to and form part of what are known as scale cars or ore lorry cars, and the invention is designed to provide a scale having improved means by which the various scale levers as well as the scale beam and its attachments are put under tension, so that when the scale car is shifted from one point to another, the various parts of the scale will be yieldingly held so that they will not be injured by the vibration which is caused by the moving of the car on its tracks.

Another object of my invention is to construct the pivot bearings of the scale beam in such manner as will cause the bearings to automatically aline themselves. Still another object of my invention is to suspend the scale beam in such manner that the beam and its journal or pivot bearings will be universally movable and to provide means whereby vibration or swinging movement of the beam and its supports is reduced to a minimum.

A further object of the invention is to provide improved means for adjusting and alining the scale beam and its journals or pivot bearings.

A still further object of my invention is to provide positively locked stops for the various blades of the beam, in order to stop the poise at the proper position on its beam to give the required weight; to provide means by which the poises are shifted upon the blades of the scale beam by the operator and also to provide means whereby the poise is locked in its extreme position on the blade of the beam.

Another object of my invention is to provide means for protecting and concealing the graduated blades mounted on the scale beam.

The precise nature of my invention will be best understood by reference to the accompanying drawings, which will now be described; it being premised, however, that various changes can be made in the details of construction and general arrangement of the parts without departing from the spirit and scope of my invention as defined in the appended claims.

In the drawings, the numeral 2 designates a portion of the ore lorry car, to which is connected one end of a beam lever 3, which in turn is connected by means of links with the fifth lever 4 of the scale.

Mounted on the lorry car 2 is the scale, or beam box, which is provided with lugs 6, from which is suspended a platform 7 by means of the adjustable rods 8. Surrounding each of these rods 8, and each contacting with the sides of the frame or box 5, so as to prevent swinging of the platform, are the rubber washers 9.

Mounted on each side of the platform 7 is a bearing block 10, and pivotally mounted in the upper portion of each of these bearing blocks is the swinging bearing member 11 provided with a hardened bearing block or plate 12.

13 is the scale beam, provided with knife edges 14 on each side thereof, which rest on the hardened plate 12, which is located in the swinging bearings 11.

15 is a centrally located member of the beam, which is provided with the knife edges 16 having a link connection 17 with the beam lever 3. Each end of this beam 13 is provided with the slots 18 to receive the ends of the graduated bars 19, each of which is provided with a poise 20, having a bail or handle 20ᵃ by which it is shifted on the blade upon which it is mounted, and a positive stop 21, which is secured at the proper position on each of the bars 19 to balance the required weight when its poise 20 is in contact therewith. The under side of each of the bars 19 is provided with the serrations or teeth 22. The stop 21 is provided with the toothed member 23 pivotally hung in the yoke 24, which straddles the bar 19. The upper end of this yoke 24 is provided with a screw-threaded bolt 25, which passes upwardly through an orifice in the stop 21, and the upper end of this bolt is provided with a thumb nut 26 to raise the yoke, and the tooth member 23 to engage the rack 22, and lock the stop in its adjusted position. Surrounding this bolt 25, and interposed between the upper wall of the stop 21 and the top of the yoke 24, is the coil spring 27, which normally tends to depress the yoke and the tooth member so that the latter will be disengaged from the rack when the thumb nut 26 is released.

28 and 29 are catches, one of which is secured to each side of the poise 20, and secured to the side of the stop 21 and to the side of the beam 13, are the respective catches 30 and 31. When the poise 20 is thrown to the left or toward the end of the beam, the catch 29 will engage the catch 31 and retain the poise in its rearward position; and when the poise is thrown to the right or against the stop 21, the catches 28 and 30 will engage each other and retain the poise in the proper position for weighing.

Each poise 20 is provided with a bail or handle 20ª and the scale beam 13 is provided with a removable cover or shield. As shown the cover is formed of a series of narrow metal plates 44 spaced apart to form slots or grooves through which the bails 20ª project to enable the poises being moved on their blades 19. The outer plates 44 are curved downwardly on their outer edges to cover the blades 19. One end of each strip or plate 44 extends into the slots 45 provided in the end of the beam for this purpose and the opposite ends of the plates have a hole or opening 46 through which the pins 47 on the other end of the beam 13 project to hold these plates in place and prevent their sidewise or endwise movement.

Mounted in the lower end of each of the beam bearings 10 is the transverse shaft 32, and secured to the outer end of this shaft is a hand lever 33. Secured to this shaft 32 and adjacent to each of the beam bearings 10 is an eccentric 34; and secured to this shaft between these eccentrics 34 are the eccentrics 35. Each of these eccentrics 35 is provided with an eccentric strap 36; the lower end of each is connected to a leaf spring 37 by means of an eye-bolt 38. This leaf spring is pivotally connected to the frame 2 of the lorry car at 39. Secured to the leaf spring 37 between the eye-bolts 38, and the pivot 39, is the yoke 40, the lower end of which surrounds the one end of the beam lever 3. Pivotally connected to lugs on the platform 7 are the leaf springs 41, the other end of these springs projecting to a point slightly below the beam 13, and to the rear of the connections between the beam and the beam lever. These leaf springs 41 project over the eccentrics 34 on the shaft 32.

42 is an adjustable poise on one of the side bars of the beam 13, and is provided for balancing the scales, and 43 is a stop for the beam which is secured to the platform 7.

When the mechanism is in the position shown in Fig. 1, each poise is thrown to the right so that the sum total of the adjusted weight of the scales can be weighed. When it is desired to merely weigh an amount equal to the amount registered on any one of the beam rods, the others of the poise members are moved to the left so that their catches 29 and 31 engage each other. When it is desired to move the lorry car from one position to another the hand lever 33 is raised to a point about 90 degrees from the position shown in Fig. 1, and the eccentrics 34 will engage with and put the leaf springs 41 under tension. The free ends of these springs will engage the side bars of the beam 13, raising the rear end of the beam and throwing the front ends of the beam down so that the same will engage the lower end of their stops 43. The rotation of this shaft will also turn the eccentrics 35, thereby raising the straps 36 so as to lift the end of the leaf spring 37, which will put the beam lever 3 under a yielding tension through the medium of the link 40.

The rotation of the shaft 32 through its various connections places all of the members of the scale under a yielding tension, and when the car is moved from one point to another the vibration of the various parts of the scale will be reduced to a minimum, thereby overcoming the wear and tear on the knife edges of the scale levers, which is very appreciable when all of the various members are free to be moved by the vibration of the car. The rubber washers 9 surrounding the suspending rods 8 permit of a slight swinging motion of the platform 7 and its various connections, while preventing or reducing to a minimum the longitudinal and transverse motion thereof.

The advantages of my invention result from the provision of means for the suspension of the scale beam and bearings upon which the beam is pivoted, also, from the provision of self-adjusting bearings for the knife edges of the beam thereby preventing a point contact of the knife edges on their hardened bearings. With such point contact, the knife edges would soon become broken or worn so as to throw the scale out of adjustment, and the swinging bearing will adjust itself to its knife edge and always give an edge contact. Also, by the provision of the transverse shaft and its eccentrics, which coöperate with the leaf springs to throw the various scale members under a yielding tension, jumping and vibration of the various members is overcome and prevented during the movement of the lorry car from place to place to be loaded.

The cover over the blades of the scale beam prevent the accumulation of dirt upon the blades and conceal the graduations on the blades from observation. This is of value where it is desired to keep secret the weights of the mixture of materials forming the charges loaded on the lorry car.

By the provision of the adjustable fixed stops I am enabled to positively fix the point at which each poise member is to be stopped on its beam rod or blade thereby avoiding the likelihood of mistakes which might be made by the negligence or lack of skill of the operator, and by the provision of the stops on each end of each of the poise members, the same will be locked in either of its extreme positions, which will avoid the rebounding of the poise when thrown to either position.

By the term "beam" as used herein is meant the scale beam which may be graduated or which may have a series of movable graduated bars thereon as shown. The term "lever" as used herein is intended to cover the scale levers which ordinarily carry the scale platform or its equivalent.

I claim:

1. A scale comprising a scale beam having knife edges secured thereto, swinging bearing members for supporting the knife edges, forked supports for the swinging bearing members, a suspended platform on which the forked support are mounted, and means by which said platform is supported to swing and move the supports in parallel lines; substantially as described.

2. A scale comprising a pivoted scale beam, a fifth lever, knife edges forming pivots for said scale beam and fifth lever, connections between the scale beam and fifth lever, means connecting said fifth lever to the scale levers, and yielding means arranged to place the scale beam under tension and hold the scale beam knife edges out of contact with the knife edge supports when the scale is not in use; substantially as described.

3. A scale comprising a pivoted beam, a lever, connections between the pivoted beam and the lever, a transverse shaft having two sets of eccentrics thereon, springs overlying one set of eccentrics, a second spring in connection with the first set of eccentrics, a yoke connected to the second spring and straddling the beam lever, and means for adjusting the eccentrics to exert pressure on the springs and place the scale members under tension; substantially as described.

4. A scale comprising a pivoted beam, an adjustable stop on said beam, a movable poise on the beam and means on the opposite ends of the poise for retaining the poise in either of its extreme positions on the beam; substantially as described.

5. A scale having a scale beam, a scale lever mechanism operatively connected to said scale beam and means rotatably movable in horizontal directions relative to the lever mechanism on which the beam is pivotally supported; substantially as described.

6. A scale comprising a pivoted scale beam, a scale lever mechanism operatively connected to said scale beam, means rotatably movable in horizontal directions for pivotally supporting the scale beam, and cushioning means for limiting the free movement of the beam supporting means; substantially as described.

7. A scale having a pivoted scale beam and means for pivotally supporting the beam, said supporting means being rotatably movable in horizontal directions, and cushioning means for limiting the free movement of the beam supporting means; substantially as described.

8. A scale having a scale beam, bearings on which said beam is pivotally mounted, scale levers below said scale beam and operatively connected thereto, and means for supporting the scale beam and its bearings arranged to swing with and transversely of the length of said beam; substantially as described.

9. A scale having a pivoted scale beam and pivoted bearings for said beam, the beam and its bearings being suspended to swing in a spherical path and yielding means for cushioning the swinging movement of said bearings and beam; substantially as described.

10. In a scale, a scale beam having a plurality of graduated blades thereon, a cover on said beam for the blades, having slots in the said cover, a movable poise mounted on each blade and means on each poise projecting through its slot above the cover for shifting the poise on its blade; substantially as described.

11. In a scale, a scale beam having a plurality of graduated blades having slots therein thereon, a cover on said beam for the blades, a movable poise mounted on each blade and a bail on each poise, said bail projecting through its slot in said cover; substantially as described.

12. A scale comprising a pivoted scale beam, scale levers below the scale beam, a fifth lever connected to the scale beam and the scale levers, yielding means movable into and out of position to hold the scale beam under tension, independent means movable into and out of position to yieldingly hold the scale levers under tension, and means for moving said yielding means into operative position to hold said scale beam and scale levers under tension when the scale is not in use; substantially as described.

In testimony whereof, I have hereunto set my hand.

ALBION P. AIKEN.

Witnesses:
G. E. F. GRAY,
FRANK A. POWER.